(No Model.)
W. F. WARE.
NURSING BOTTLE.
No. 347,018. Patented Aug. 10, 1886.
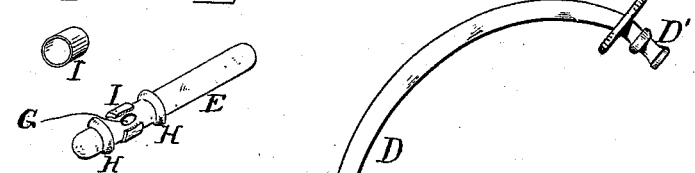
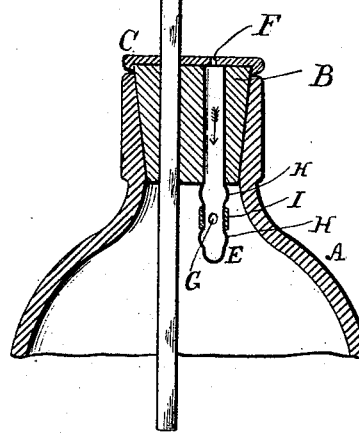
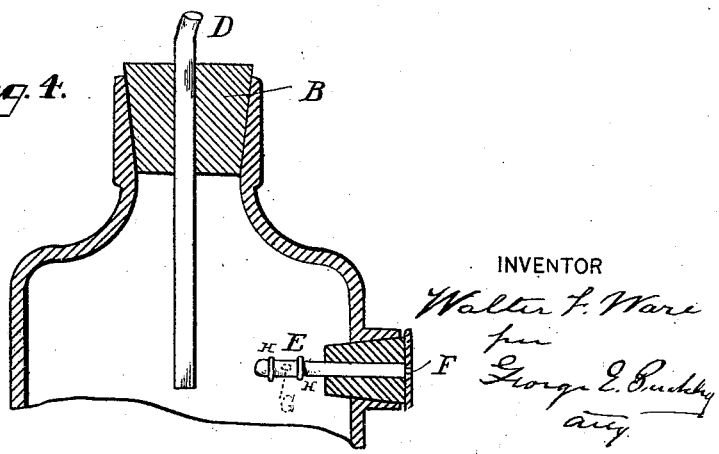
WITNESSES:
INVENTOR
N. PETERS, Photo-Lithographer, Washington, D. C.

UNITED STATES PATENT OFFICE.

WALTER F. WARE, OF CAMDEN, NEW JERSEY.

NURSING-BOTTLE.

SPECIFICATION forming part of Letters Patent No. 347,018, dated August 10, 1886.

Application filed May 5, 1886. Serial No. 201,138. (No model.)

*To all whom it may concern:*

Be it known that I, WALTER F. WARE, a citizen of the United States, and a resident of Camden, New Jersey, have invented an Improvement in Nursing-Bottles for Children; and I do hereby declare the following to be a full, clear, and exact description of the same, reference being had to the annexed drawings, making part hereof.

The nature of my invention will fully appear from the following specification and claim.

In the drawings, Figure 1 is a vertical cross-sectional view of the upper part of a bottle with my improvement applied thereto, the latter and the cork or stopper being also in cross-section, and the sucking-tube in elevation; Fig. 2, a detached perspective view of the rubber band forming part of the air-valve; Fig. 3, a detached perspective view of the air-tube, showing also the air-exit hole therein. Fig. 4 shows a longitudinal vertical sectional modification of my device.

A is the body of the bottle; B, the cork or stopper; C, the cap of the cork, which I make of bone, and secure in place by means of cement; D, the flexible sucking-tube, with the usual nipple or mouth-piece, D'; E, the straight air-tube, closed at its lower end and open above beneath the small hole F in the cap C; G, a small opening in the side of the lower part of the straight tube E; H H, two annular ribs on the lower part of tube E, one above, the other below opening G; I, a short flexible rubber band or ring sprung around the tube E and covering the hole G. The ribs H H serve the purpose of preventing the ring I from slipping out of place. I make the tube E of glass; but of course other suitable materials—such as hard rubber or nickel-plated metal—could be used for this purpose. This tube is straight, and can be removed from its hole in the cork B and cleansed, and is of larger diameter than the opening F in the cap C.

K is the ordinary shield to the mouth-piece.

The bottle A is designed to contain milk for baby-food; and the object of my device is to permit air to enter the bottle, but prevent the escape of the milk if the bottle is inverted or upset. As the milk is drawn from the bottle through the sucking-tube D, the tendency of the operation is to form a partial vacuum in the interior thereof. The result will be that air will be drawn down the tube E in the direction of the arrow, and will gradually force its way under the flat rubber ring I into the interior as the milk becomes exhausted. If the bottle is inverted, however, the pressure of the milk against the rubber will force the latter against the tube E and bulge it into the opening G, thus effectually closing the latter and preventing the milk from escaping. The tension of the rubber ring I from its elasticity, however, causes it to fit closely over the opening G in the air-tube E, thus preventing the escape or leakage of milk or other liquid through the air-passage. The straight form of the removable tube E renders it easier to cleanse the latter, and also the interior of the straight hole in the cork, which receives the tube E. The hole F, being smaller than the interior bore of tube E, while it insures a sufficient supply of air for the bottle, as above described, will keep the air-pressure so low against the rubber ring I, through opening G, when the bottle is upset and out of use, as to make certain that the greater pressure of the milk will force the rubber against or into this opening with force great enough to close the latter.

I use cork for the stopper B, though rubber may be employed.

The bottle is generally of glass or hard rubber.

The air-supply tube in my device is separated from the sucking-tube.

The constant supply of air, which results from the lessening of the quantity of milk, obviates the necessity for hard sucking on the part of the child using the bottle. This hard sucking results in the child swallowing large quantities of outside air around the sucking-nipple, which frequently causes colic.

As illustrated in the drawings, Fig. 4, the air-supply tube may be set in the side of the nursing-bottle, or in any other part of the same, apart from the cork proper.

What I claim as new is—

In a nursing-bottle, the combination of the sucking-tube D, cork B, cap C, with small orifice F, tube E, piercing said stopper beneath the small orifice F, and open above, but closed below, said tube being provided with side air-opening, G, near its lower extremity, and flexible ring or collar I, covering said opening, the said parts arranged and operating substantially as described.

WALTER F. WARE.

Witnesses:
  WM. H. CARSON,
  GEORGE E. BUCKLEY.